United States Patent Office 3,636,072
Patented Jan. 18, 1972

3,636,072
NOVEL HYDROPHENANTHRENE ESTERS
Alexander D. Cross, Mexico City, Mexico, and John H. Fried, Palo Alto, Calif., assignors to Syntex Corporation, Panama, Panama
No Drawing. Filed Sept. 7, 1967, Ser. No. 665,951
Int. Cl. C07c 69/76, 69/00
U.S. Cl. 260—468.5    9 Claims

ABSTRACT OF THE DISCLOSURE

Bicyclo[2.2.2]octane - 1 - carbonyloxy, bicyclo[2.2.2]octane - 1 - carbonyloxymethyl, bicyclo[2.2.2]octane - 1 - methyleneoxycarbonyl, bicyclo[2.2.2]octane - 1 - methylenecarbonate, bicyclo[2.2.2]octane - 1 - methylenecarbonyldioxymethyltricyclo[3.3.1.1$^{1,5}$]decane - 1 - methylenecarbonate, and tricyclo[3.3.1.1$^{1,5}$]decane - 1 - methylenecarbonyldioxymethyl esters of tetrahydro-, hexahydro-, and/or octahydrophenanthrenes which esters are useful for their long-acting anti-fertility and estrogenic activity and processes for the preparation of these novel esters.

This invention relates to a new and useful hydrophenanthrene esters. It more specifically pertains to novel and useful hydrophenanthrene bicyclo[2.2.2]octane-1-carbonyloxy, bicyclo[2.2.2]octane - 1 - carbonyloxymethyl, bicyclo[2.2.2]octane - 1 - methyleneoxycarbonyl, bicyclo[2.2.2]octane - 1 - methylenecarbonate, bicyclo[2.2.2]octane - 1 - methylenecarbonyldioxymethyl, tricyclo[3.3.1.1$^{1,5}$]decane - 1 - methylenecarbonate, and tricyclo[3.3.1.1$^{1,5}$]decane - 1 - methylenecarbonyldioxymethyl esters as well as the various molecularly modified derivatives thereof, the hydrophenanthrene nucleus thus bearing a novel group represented by the Formulas (A), (B), (C), and (D):

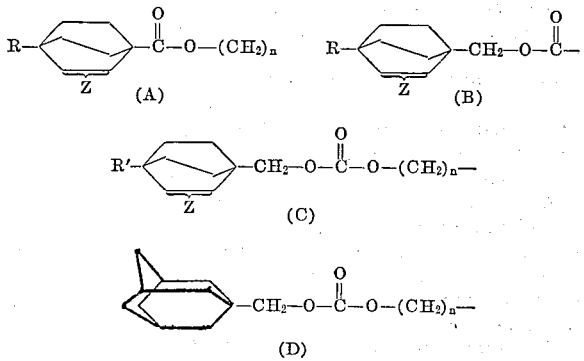

wherein, in each applicable formula, R is hydrogen, chloro, fluoro, trifluoromethyl, cyano, (lower)alkyloxy, acyloxy, (lower)alkyloxymethyl, acyloxymethyl, (lower)alkyl, or aryl; R' is identical in meaning to R, exclusive of cyano, acyloxy, and acyloxymethyl; Z is a carbon-carbon single bond or a carbon-carbon double bond; and $n$ is the integer 0 or 1.

In the preferred embodiments hereof, the hydrophenanthrene nucleus is substituted at the C-2 position with a group rpresented by one of the above Formulas (A) in which $n$ is the integer 1, (B), (C) in which $n$ is the integer 1, and (D) in which $n$ is the integer 1 and/or at the C-7 position with a group represented by one of the above Formulas (A) in which $n$ is the integer 0, (C) in which $n$ is the integer 0, and (D) in which $n$ is the integer 0.

These novel hydrophenanthrene esters of the present invention include the tetrahydro, hexahydro, and octahydro series and are represented by the following Formula I:

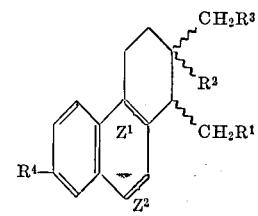

wherein $R^1$ is hydrogen or methyl;
$R^2$ is hydroxymethyl and the conventional hydrolyzable esters thereof (acyloxymethyl), (lower)alkyloxymethyl, carboxy, carb(lower)alkoxy, or a polycyclic group represented by one of the above Formulas (A) in which $n$ is the integer 1, (B), (C) in which $n$ is the integer 1, and (D) in which $n$ is the integer 1;
$R^3$ is hydrogen or methyl;
$R^4$ is hydroxy and the conventional hydrolyzable esters thereof, (lower)alkyloxy, tetrahydropyran - 2 - yloxy, tetrahydrofuran-2-yloxy, cyclopentyloxy, or a polycyclic group represented by one of the above Formulas (A) in which $n$ is the integer 0, (C) in which $n$ is the integer 0, and (D) in which $n$ is the integer 0; and
each of $Z^1$ and $Z^2$ is a carbon-carbon single bond or a carbon-carbon double bond, $Z^2$ being a single bond when $Z^1$ is a single bond;
one of $R^2$ and $R^4$ being said polycyclic group.

The terms "(lower)alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed, preferably, those derived from hydrocarbon carboxylic acids or phosphoric acids and their salts. The term "hydrocarbon carboxylic acid" defines both substituted and unsubstituted hydrocaroon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate 2 - chloro - 4-nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" is included aryl, aralkyl, and alkaryl groups, such as phenyl, p-chlorophenyl, p-methoxyphenyl, benzyl, phenethyl, tolyl, ethylphenyl, and the like. The wavey lines (⌇) used in the structural formulas hereof designates and includes both possible isomeric configurations.

Thus included within the scope of the present invention are the novel hydrophenanthrene esters represented by the following Formulas I-a, I-b, I-c, I-d, I-e, I-f, and I-g;

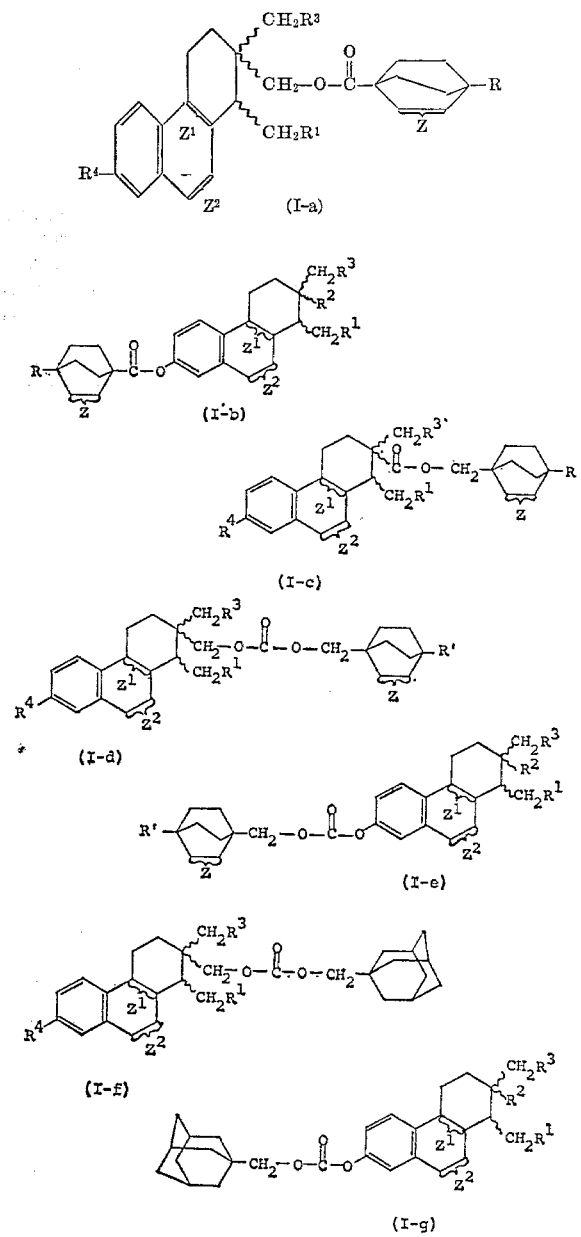

wherein, in each formula, each of R, R′, $R^1$, $R^2$, $R^3$, $R^4$, Z, $Z^1$, and $Z^2$ is as hereinbefore defined.

It will be understood that the above represented compounds and the scope of the instant invention include the corresponding novel hydrophenanthrene C-2, 7 bisesters.

The novel polycyclic esters of this invention possess enhanced and long-acting anti-fertility and estrogenic activity. They are accordingly useful in the replacement therapy for estrogen deficiencies and in the control and regulation of fertility and the management of various menstrual disorders.

These compounds are administered via the usual routes, whether orally or parenterally, either singly, in conjunction with other medicinal agents, or in pharmaceutically acceptable non-toxic compositions formed by the incorporation of any of the normally employed excipients. Dosage levels vary according to the particular affliction or condition being treated, its degree or severity, and the observed response to treatment but generally a daily rate of from 0.1 mg. to 1 mg. per kilogram of body weight is satisfactory.

The novel hydrophenanthrene esters of the present invention are prepared via usual esterification reaction union of the polycyclic moiety with the hydrophenanthrene moiety, the specific procedures conditioned upon the particular ester prepared as hereinafter set forth in more detail.

The novel hydrophenanthrene bicyclic esters hereof which are represented above by Formulas I-a and I-b are prepared by esterifying the corresponding hydrophenanthrenealcohol (hydroxy at C-7 and/or hydroxymethyl at C-2) either with the acid halide or acid anhydride which otherwise correspond to the groups represented by Formula (A), that is, a bicyclo[2.2.2]octan-1-oic acid halide (preferably, chloride), a bicyclo[2.2.2]octan-1-oic anhydride (preferably, (lower)alkanoic anhydride), or the corresponding C-2 unsaturated and/or C-4 substituted derivatives thereof. Alternatively, the acid per se or the esters thereof can be so employed.

In the practice of the preferred aspects of the above preparation and except as qualified below for the mono C-7 addition, the reaction is conducted in the presence of base such as is provided by an organic tertiary amine, for example, triethylamine, pyridine, and the like. The reaction is also conducted with an inert solvent, such as dioxane, tetrahydrofuran, diethyl ether, benzene, xylene, and the like, with the reaction being carried out at temperatures of from about 0° C. to about 100° C. or higher upwards of 150° C. Temperatures below 0° C. may be employed depending mainly upon reactants and reaction choice.

The novel mono ester is introduced on the methyl carbon at C-2 by first bisesterifying the C-2 hydroxymethyl, C-7 hydroxy diol by the above procedure followed by hydrolyzing the resultant compound under mild conditions, such as with acetic acid or methanolic sodium bicarbonate, to remove the C-7 ester group. Thereafter, the 7-hydroxyl can be conventionally esterified to furnish the corresponding mixed ester derivatives.

Alternatively, the 7-tetrahydropyran-2′-yloxy compound can be esterified at C-2 to give the novel ester and the resultant compound hydrolyzed with acid to furnish the 7-hydroxy derivatives containing the novel ester group on the methyl carbon attached C.2 position of the hydrophenanthrene nucleus.

The preparation of the mono C-7 ester follows by preferably treating the 7-hydroxy starting compound with the bicyclic acid halide in the presence of aqueous base solution, for example, an aqueous alkali metal hydroxide solution such as via the conditions of the Schotten-Baumann reaction. Thereafter, the C-2 hydroxymethyl group, if present, can be conventionally esterified thus furnishing the mixed ester compounds.

The bicyclo[2.2.2]octane- and bicyclo[2.2.2]oct-2-ene-1-carboxylic acid halides and anhydrides for the above procedures are prepared from the corresponding free acid compounds by methods known per se as described, for example, in Wagner and Zook, Synthetic Organic Chemistry, John Wiley and Sons, Inc., N.Y. (1953), p. 546 et seq. and p. 558 et seq., respectively.

The corresponding free carboxylic acid compounds from which the acid halides and acid anhydrides are formed are also prepared by known methods. One such method involves treating a 4-substituted or -unsubstituted cyclohexa-1,3-diene-1-carboxylic acid or -1-carboxylate by the Diels-Alder addition of ethylene, such as according to the conditions set forth in U.S. Pat. 3,081,334 to afford the corresponding 4-substituted or -unsubstituted bicyclo-[2.2.2]octane-1-carboxylic acids. Thereafter, the thus obtained saturated acids can be dehydrogenated to the corresponding 4-substituted or -unsubstituted bicyclo[2.2.2]oct-2-ene-1-carboxylic acids. Other suitable methods for preparing these acids are set forth by Holtz et al., J. Am. Chem. Soc. 86, 5183 (1964); Kaurer et al., J. Org. Chem. 30, 1431 (1965); Grob et al., Helv. Chim. Acta. 41, 1191 (1958); Roberts et al. J. Am. Chem. Soc. 75, 637 (1953); Belgium Pat. 665,701; and Netherlands Pat. 6507979.

The novel bicyclic esters hereof represented by Formula I–c above are prepared by treating a 2-carbonyl halide (preferably, chloride) hydrophenanthrene starting compound with the corresponding bicyclo-1-hydroxymethyl derivatives via conditions similar to those set forth above for the C–2 addition in the preparation of the compounds represented by Formula I–a. For this practice, the bicyclo-1-hydroxymethyl reactant is conventionally provided from the free acid or acid halide compounds by conventional reduction with lithium aluminum hydride and the like such as via the procedure described in Wagner and Zook, op. cit., p. 155 et. seq. The esterification reaction at C–2 is performed, as mentioned, with the 2-carbonyl halide function, the C–7 position being substituted by a group other than hydroxy. This position can contain the tetrahydropyran-2-yloxy grouping or the 7-acetate can be employed, followed by mild base hydrolysis after the principal esterification reaction in order to restore the C–7 free hydroxyl, if desired.

The novel hydrophenanthrene bicyclic carbonate esters hereof which are represented above by Examples I–d and I–e are prepared analogously to the methods operable for the preparation of the compounds of Formulas I–a and I–b as set forth above utilizing, instead, the appropriate hydrophenanthrene alcohol with the chlorocarbonate (chloroformate) which otherwise corresponds to the groups represented by Formula (C), that is, a bicyclo[2.2.2]octane - 1 - methylenechlorocarbonate or the corresponding C–2 unsaturated and/or C–4 substituted derivatives thereof.

The chlorocarbonate reactants are also conveniently prepared via known procedures. First, the corresponding free carboxylic acid compound (obtained as set forth above) is conveniently reduced as described above and the resultant alcohol (methylol) treated with phosgene such as according to the procedure described in Wagner and Zook, op. cit., p. 483 et seq.

The novel hydrophenanthrene tricyclic carbonate esters hereof which are represented above by Formulas I–f and I–g are prepared analogously to the methods set forth above for the preparation of the bicyclic carbonate esters with the substitution of the corresponding tricyclic chlorocarbonate (chloroformate) which otherwise corresponds to the group represented by Formula (D) above, namely, tricyclo[3.3.1.1$^{1,5}$]decane - 1 - methylenechlorocarbonate, in lieu of the bicyclo derivatives.

This tricyclic chlorocarbonate is similarly prepared from tricyclo[3.3.1.1$^{1,5}$]decane - 1 - carboxylic acid, otherwise referred to as adamantane-1-carboxylic acid, upon conventional reduction and treatment with phosgene as described supra.

The hydrophenanthrene starting compounds are known in the art or can be prepared via processes known per se. Thus, the hydrophenanthrene starting compounds containing the 2-carboalkoxy grouping are reduced by treatment with a metal hydride, such as lithium aluminum hydride and the like, in an inert solvent, such as tetrahydrofuran, at a temperature ranging from about 25° C. to reflux temperature for from one to six hours to afford the corresponding 2-hydroxymethyl derivatives. Hydrolysis of the 2-carbalkoxy compounds, in one manner, with sodium or potassium hydroxide in a glycol solvent at reflux temperatures for from about one to ten hours, affords the corresponding 2-carboxy derivatives. The 2-carbonyl chlorides and carbonyl fluorides can be prepared upon reaction of the 2-carboxy derivative with thionyl chloride and N-(2-chloro-1,1,2-trifluoroethyl)diethylamine, respectively. Preparation of the C–7 ethers follows upon etherification with dihydropyran (for the tetrahydropyran-2-yl ethers) and dihydrofuran (for the tetrahydrofuran-2-yl ethers) with acid catalyst in inert solvent. Cyclopentyl ethers are prepared upon reaction of the hydroxy compound with sodium hydride and cyclopentyl bromide. The 2-carbalkoxy compounds and the other starting hydrophenanthrenes hereof can be prepared by known methods such as that described in Helv. Chim. Acta. 28, 1506 (1945) and Helv. Chim. Acta. 30, 777 (1947) and U.S. patent application Ser. No. 589,494, filed Oct. 26, 1966.

Acylation to the conventional hydrolyzable ester of any remaining hydroxyl group is accomplished, as desired, upon treatment with the appropriate acylating agent, such as acetic or other anhydride, in pyridine for the secondary alcohols and the corresponding acid chloride with acid catalyst for the tertiary hydroxy group.

The compounds hereof possess centers of optical asymmetry and can thus exist in several different isomeric forms. A particularly preferred configuration of the C–1,2 substituents is cis, that is, the configural relationship of the substituents represented by $\sim$ CH$_2$R$^1$ and $\sim$ R$^2$ at C–1 and C–2, respectively, is preferably cis. While there exists a preferred configuration of the compounds of the present invention, as mentioned, it will be understood that each and every possible isomer is included within the scope hereof.

The examples which follow are intended to merely illustrate the manner by which this invention can be practiced and therefore are not to be construed as limitations upon the overall scope hereof.

EXAMPLE 1

A mixture of 2.5 g. of 1,2-dimethyl-2-hydroxymethyl-7-hydroxy - 1,2,3,4-tetrahydrophenanthrene in 15 ml. of pyridine containing 4.0 g. of bicyclo[2.2.2]octane-1-carboxylic acid chloride is heated as steam bath temperature for about two hours. The mixture is then poured into ice water and the solid which forms collected by filtration, washed with water, and dried yielding 1,2-dimethyl-2-(bicyclo[2.2.2]octane-1' - carbonyloxy)methyl - 7-(bicyclo[2.2.2]octane - 1' - carbonyloxy)-1,2,3,4, - tetrahydrophenanthrene.

A mixture of 2.5 g. of 1,2-dimethyl-2-hydroxymethyl-7 - hydroxy - 1,2,3,4 - tetrahydrophenanthrene, 10 ml. of pyridine, 20 ml. of benzene, and 5.0 g. of 4 - methylbiyclo[2.2.2]oct-2-ene - 1 - carboxylic acid chloride is heated at reflux temperature for four hours. The mixture is then poured into ice water, the solid which forms is collected by filtration, washed with water, and dried to yield 1,2 - dimethyl - 2 - (4'-methylbicyclo[2.2.2]oct-2'-ene-1' - carbonyloxy) - methyl - 7-(4' - methylbicyclo[2.2.2]oct-2'-ene-1' - carbonyloxy) - 1,2,3,4-tetrahydrophenanthrene.

Similarly, 1,2 - dimethyl - 2-(bicyclo[2.2.2]oct-2'-ene-1'-carbonyloxy)methyl - 7 - (bicyclo[2.2.2]oct-2'-ene-1'-carbonyloxy) - 1,2,3,4 - tetrahydrophenanthrene and 1,2-dimethyl - 2 - (4'-methylbicyclo[2.2.2]octane - 1'-carbonyloxy)methyl - 7 - (4'-methylbicyclo[2.2.2]octane-1'-carbonyloxy) - 1,2,3,4 - tetrahydrophenanthrene are prepared upon proper substitution of starting compounds.

Similarly, the following are prepared upon substitution of the appropriate starting compound:

1,2-diethyl-2-(bicyclo[2.2.2]octane-1'-carbonyloxy)-methyl-7-(bicyclo[2.2.2]octane-1'-carbonyloxy)-1,2, 3,4-tetrahydrophenanthrene, 1,2-diethyl-2-(4'-methylbicyclo[2.2.2]oct-2'-ene-1'-carbonyloxy)methyl-7-(4'-methylbicyclo[2.2.2]oct-2'-ene-1'-carbonyloxy)-1,2,3,4-tetrahydrophenanthrene, 1,2-diethyl-2-(bicyclo[2.2.2]oct-2'-ene-1'-carbonyloxy)methyl-7-(bicyclo[2.2.2]oct-2'-ene-1'-carbonyloxy)-1,2,3,4-tetrahydrophenanthrene, 1,2-diethyl-2-(4'-methylbicyclo[2.2.2]octane-1'-carbonyloxy)methyl-7-(4'-methylbicyclo[2.2.2]octane-1'-carbonyloxy)-1,2,3,4-tetrahydrophenanthrene, 1-methyl-2-ethyl-2-(bicyclo[2.2.2]octane-1'-carbonyloxy)methyl-7-(bicyclo[2.2.2]octane-1'-carbonyloxy)-1,2,3,4-tetrahydrophenanthrene, 1-methyl-2-ethyl-2-(4'-methylbicyclo[2.2.2]oct-2'-ene-1'-carbonyloxy)methyl-7-(4'-methylbicyclo[2.2.2]oct-2'-ene-1'-carbonyloxy)-1,2,3,4-tetrahydrophenanthrene, 1-methyl-2-ethyl-2-(bicyclo[2.2.2]oct-2'-ene-1'-carbonyloxy)methyl-7-(bicyclo[2.2.2]oct-2'-ene-1'-carbonyloxy)-1,2,3,4-tetrahydrophenanthrene, 1-methyl-2-ethyl-2-(4'-methylbicyclo[2.2.2]octane-1'-carbonyloxy)methyl-7-(4'-methylbicyclo[2.2.2]octane-1'-carbonyloxy)-1,2,3,4-tetrahydrophenanthrene, 1-ethyl-2-methyl-2-(bicyclo[2.2.2]octane-1'-carbonyloxy)methyl-7-(bicyclo[2.2.2]octane-1'-carbonyloxy)-1,2,3,4-tetrahydrophenanthrene, 1-ethyl-2-methyl-2-(4'-methylbicyclo[2.2.2]oct-2'-ene-1'-carbonyloxy)methyl-7-(4'-methylbicyclo[2.2.2]oct-2'-ene-1'-carbonyloxy)-1,2,3,4-tetrahydrophenanthrene, 1-ethyl-2-methyl-2-(bicyclo[2.2.2]oct-2'-ene-1'-carbonyloxy)methyl-7-(bicyclo[2.2.2]oct-2'-ene-1'-carbonyloxy)-1,2,3,4-tetrahydrophenanthrene, 1-ethyl-2-methyl-2-(4'-methylbicyclo[2.2.2]octane-1'-carbonyloxy)methyl-7-(4'-methylbicyclo[2.2.2]octane-1'-carbonyloxy)-1,2,3,4-tetrahydrophenanthrene, as well as the 1,2,3,4,9,10-hexahydro and 1,2,3,4,9,10,11,12-octahydro derivatives otherwise corresponding to the above compounds.

Upon substitution of the appropriate substituted acid chloride (as set forth in the third paragraph of Example 9) in lieu of either bicyclo[2.2.2]octane-1-carboxylic acid chloride or 4-methylbicyclo[2.2.2]oct-2-ene-1-carboxylic acid chloride in each of the procedures set forth above in the instant example, the corresponding C-2,7 bis-esters of the corresponding starting hydrophenanthrene bishydroxy compounds hereof are prepared.

EXAMPLE 2

A mixture of 100 mg. of 1,2-dimethyl-2-(bicyclo[2.2.2]octane-1'-carbonyloxy)methyl - 7- (bicyclo[2.2.2]octane-1'-carbonyloxy-1,2,3,4-tetrahydrophenanthrene and 100 mg. of sodium bicarbonate in 10 ml. of methanol and 3 ml. of water is refluxed for three hours. Thereafter, the methanol is evaporated under reduced pressure and the residue is extracted with ethyl acetate and water. Evaporation on the ethyl acetate from these extracts yields 1,2-dimethyl - 2 - (bicyclo[2.2.2]octane-1'-carbonyloxy)methyl-7-hydroxy-1,2,3,4-tetrahydrophenanthrene which is collected by filtration and recrystallized from acetone:hexane.

Alternatively, the foregoing ester hydrolysis can be performed as follows.

A mixture of 100 mg. of 1,2-dimethyl-2-(bicyclo[2.2.2]octane - 1' - carbonyloxy)methyl-7-(bicyclo[2.2.2]-1'-carbonyloxy)-1,2,3,4-tetrahydrophenanthrene in a 50% aqueous acetic acid solution containing 1% hydrochloric acid is refluxed for one hour and is then poured into ice water. This mixture is extracted with methylene chloride and the extracts are in turn washed with water to neutrality, dried over sodium sulfate, and evaporated to dryness to yield 1,2 - dimethyl - 2 - (bicyclo[2.2.2]octane-1'-carbonyloxy)methyl-7-hydroxy-1,2,3,4 - tetrahydrophenanthrene which can be recrystallized from acetone:hexane.

Similarly, the other bisesters prepared in the third and fourth paragraphs of Example 1 as well as those variously otherwise substituted as described in the last paragraph of Example 1 are treated as above set forth to give the corresponding monoester attached to the C-2 methyl group, the C-7 position thus bearing a hydroxyl.

EXAMPLE 3

To a mixture of 2.5 g. of 1,2-dimethyl-2-carbethoxy-7-hydroxy -1,2,3,4-tetrahydrophenanthrene in 10 ml. of a 10% aqueous sodium hydroxide solution is added 2.0 g. of bicyclo[2.2.2]octane-1-carboxylic acid chloride and the solution is shook vigorously for ten to fifteen minutes. The reaction mixture is made slightly alkaline by the addition of sodium carbonate and is then diluted with water. It is then filtered, the precipitate being washed with water and dried to give 1,2-dimethyl-2-carbethoxy-7-(bicyclo-[2.2.2]octane - 1' - carbonyloxy)-1,2,3,4-tetrahydrophenanthrene which is recrystallized from hot methanol.

Thereafter, the 2-carbethoxy can be hydrolyzed to the acid or reduced to the hydroxymethyl (see Example 14), both as set forth hereinafter. The hydroxymethyl can thereafter be etherified or esterified as desired.

Similarly, the following are prepared upon substitution of the appropriate starting compound:

1-ethyl-2-methyl-2-hydroxymethyl-7-(bicyclo[2.2.2]octane-1'-carbonyloxy)-1,2,3,4-tetrahydrophenanthrene, 1-methyl-2-ethyl-2-hydroxymethyl-7-(bicyclo[2.2.2]octane-1'-carbonyloxy)-1,2,3,4-tetrahydrophenanthrene, and 1,2-diethyl-2-hydroxymethyl-7-(bicyclo[2.2.2]octane-1'-carbonyloxy)-1,2,3,4-tetrahydrophenanthrene, as well as the 1,2,3,4,9,10-hexahydro and 1,2,3,4,9,10,11,12-octahydro derivatives thereof and the 2-methoxymethyl, 2-ethoxymethyl, 2-acetoxymethyl, 2-carboxy, 2-carbomethoxy, and 2-carbethoxy derivatives which otherwise correspond to the above compounds.

Upon substitution of the appropriate substituted acid chloride (as set forth in the third paragraph of Example 9, infra.) in lieu of the other bicyclo carboxylic acid chloride employed herein, the corresponding C-7 monoester of the corresponding starting hydrophenanthrene or substituted hydrophenanthrene hydroxy compounds hereof are prepared.

EXAMPLE 4

A mixture of 2.5 g. of 1,2-dimethyl-2-chloroformyl-7-acetoxy-1,2,3,4-tetrahydrophenanthrene in 15 ml. of pyridine containing 2.0 g. of bicyclo[2.2.2]octane-1-methylol heated at steam bath temperature for about two hours. The mixture is then poured into ice water and the solid which forms collected by filtration, washed with water, and dried yielding 1,2-dimethyl-2-(bicyclo[2.2.2]octane-1'-methyleneoxycarbonyl) - 7 - acetoxy-1,2,3,4-tetrahydrophenanthrene.

The 7-acetoxy group is thereafter hydrolyzed according to the procedure of Example 2 (paragraph 1) to give 1,2-dimethyl - 2 - (bicyclo[2.2.2]octane-1'-methyleneoxycarbonyl)-7 - hydroxy-1,2,3,4-tetrahydrophenanthrene. Alternatively, the foregoing esterification procedure can be performed utilizing the 7-tetrahydropyranyloxy compound which ether group can be hydrolyzed with acid via conventional means after the principal esterification reaction.

Similarly, the following are prepared upon substitution of the appropriate 2-carboxy starting compound:

1,2-diethyl-2-(bicyclo[2.2.2]octane-1'-methyleneoxycarbonyl)-7-hydroxy-1,2,3,4-tetrahydrophenanthrene, 1-methyl-2-ethyl-2-(bicyclo[2.2.2]octane-1'-methyleneoxycarbonyl)-7-hydroxy-1,2,3,4-tetrahydrophenanthrene, and 1-ethyl-2-methyl-2-(bicyclo[2.2.2]octane - 1' - methyleneoxycarbonyl)-7 - hydroxy - 1,2,3,4 - tetrahydrophenanthrene, as well as the 1,2,3,4,9,10-hexahydro and 1,2,3,4,9,10,11,12-octahydro derivatives thereof and the 7-lower)alkyloxy, 7-tetrahydropyran-2'-yloxy, 7-tetrahydrofuran-2'-yloxy, and 7-cyclopentyloxy derivatives which otherwise correspond to the above compounds.

Upon substitution of the appropriate substituted hydroxymethyl derivative (as set forth in Example 10) in lieu of bicyclo[2.2.2]octane-1-methylol in the instant example, the corresponding C–2 monoesters of the corresponding starting hydrophenanthrene bishydroxy compounds hereof are prepared.

EXAMPLE 5

A mixture of 2.5 g. of 1,2-dimethyl-2-hydroxymethyl-7-hydroxy-1,2,3,4-tetrahydrophenanthrene in 15 ml. of pyridine containing 4.0 g. of bicyclo[2.2.2]octane-1-methylenechlorocarbonate is heated at steam bath temperature for about two hours. The mixture is then poured into ice water and the solid which forms collected by filtration, washed with water, and dried yielding 1,2-dimethyl-2-(bicyclo[2.2.2]octane - 1' - methylenecarbonyldioxy)methyl-7-(bicyclo[2.2.2]octane-1' - methylenecarbonyldioxy)-1,2,3,4-tetrahydrophenanthrene.

Similarly, the corresponding bis-carbonate esters of the other compounds set forth in Example 1 above are prepared.

Upon substitution of the appropriate substituted chlorocarbonate (as set forth in Example 11) in lieu of bicyclo[2.2.2]octane-1-methylenechlorocarbonate in the instant example, the corresponding C–2,7 bisesters of the corresponding starting hydrophenanthrene bishydroxy compounds hereof are prepared.

Hydrolysis of the thus prepared compound according to the procedures set forth in Example 2 above affords 1,2-dimethyl-2-(bicyclo[2.2.2]octane - 1' - methylenecarbonyldioxy)-methyl-7-hydroxy - 1,2,3,4 - tetrahydrophenanthrene.

Hydrolysis of the other bis-carbonate esters obtained as herein described affords the corresponding monoesters attached to the C–2 position, the C–7 carbon bearing a hydroxyl.

EXAMPLE 6

By repeating the procedure set forth in Example 3 above, substituting bicyclo[2.2.2]octane-1-methylenechlorocarbonate for bicyclo[2.2.2]octane-1-carboxylic acid chloride, there is obtained 1,2-dimethyl-2-carbethoxy-7-(bicyclo[2.2.2]octane-1' - methylenecarbonyldioxy) - 1,2,3,4-tetrahydrophenanthrene.

Similarly, the foregoing procedure can be practiced on the other corresponding compounds set forth in the penultimate paragraph of Example 1.

Upon substitution of the appropriate substituted chlorocarbonate (as set forth in Example 11) in lieu of bicyclo[2.2.2]octane-1-methylenechlorocarbonate in the instant example, the corresponding C–7 monoesters of the corresponding starting hydrophenanthrene compounds hereof are prepared. These can be further modified at C–2, as desired.

EXAMPLE 7

By repeating the procedure set forth in Example 5 above, substituting tricyclo[3.3.1.1$^{1,5}$]decane-1-methylene-chlorocarbonate for bicyclo[2.2.2]octane-1-methylenechlorocarbonate, there is ultimately obtained 1,2-dimethyl - 2-(tricyclo[3.3.1.1$^{1,5}$]decane-1'-methylenecarbonyldioxy)methyl-7-hydroxy - 1,2,3,4 - tetrahydrophenanthrene through the corresponding bisester intermediates.

Similarly, the foregoing procedure can be practiced on the other corresponding compounds set forth in the penultimate paragraph of Example 1.

EXAMPLE 8

By repeating the procedure set forth in Example 6 above, substituting tricyclo[3.3.1.1$^{1,5}$]decane-1-methylenechlorocarbonate for bicyclo[2.2.2]octane-1-methylenechlorocarbonate, there is obtained 1,2-dimethyl-2-carbethoxy-7-(tricyclo[3.3.1.1$^{1,5}$]decane - 1' - methylenecarbonyldioxy)-1,2,3,4-tetrahydrophenanthrene, which can be further modified at C–2.

Similarly, the foregoing procedure can be practiced on the other corresponding compounds set forth in the penultimate paragraph of Example 1.

EXAMPLE 9

A mixture of 10 g. of bicyclo[2.2.2]octane-1-carboxylic acid, 20 ml. of thionyl chloride in two drops of dimethylformamide, and about 40 ml. of benzene is heated at reflux temperature for about 2.5 hours. The resultant mixture is then fractionally distilled to give bicyclo[2.2.2]octane-1-carboxylic acid chloride.

A mixture of 15 g. of 4-methylbicyclo[2.2.2]oct-2-ene-1-carboxylic acid, 25 ml. of thionyl chloride, and a drop of dimethylformamide is heated at reflux temperature for about 1.5 hours. Fractional distillation of the reaction mixture gives 4-methylbicyclo[2.2.2]oct-2-ene-1-carboxylic acid chloride.

Similarly, upon the substitution of other bicyclo[2.2.2]octane-1-carboxylic acids and other bicyclo[2.2.2]oct-2-ene-1-carboxylic acids in the procedures set forth in the immediately preceding two paragraphs, there is obtained the following corresponding acid chlorides:

bicyclo[2.2.2]oct-2-ene-1-carboxylic acid chloride,
4-methylbicyclo[2.2.2]octane-1-carboxylic acid chloride,
4-phenylbicyclo[2.2.2]oct-2-ene-1-carboxylic acid chloride,
4-phenylbicyclo[2.2.2]octane-1-carboxylic acid chloride,
4-n-propylbicyclo[2.2.2]octane-1-carboxylic acid chloride,
4-n-propylbicyclo[2.2.2]oct-2-ene-1-carboxylic acid chloride,
4-ethylbicyclo[2.2.2]octane-1-carboxylic acid chloride,
4-ethylbicyclo[2.2.2]oct-2-ene-1-carboxylic acid chloride,
4-benzylbicyclo[2.2.2]octane-1-carboxylic acid chloride,
4-chlorophenylbicyclo[2.2.2]octane-1-carboxylic acid chloride,
4-chlorobicyclo[2.2.2]octane-1-carboxylic acid chloride,
4-chlorobicyclo[2.2.2]oct-2-ene-1-carboxylic acid chloride,
4-fluorobicyclo[2.2.2]octane-1-carboxylic acid chloride,
4-fluorobicyclo[2.2.2]oct-2-ene-1-carboxylic acid chloride,
4-trifluoromethylbicyclo[2.2.2]octane-1-carboxylic acid chloride,
4-trifluoromethylbicyclo[2.2.2]oct-2-ene-1-carboxylic acid chloride,
4-cyanobicyclo[2.2.2]octane-1-carboxylic acid chloride,
4-cyanobicyclo[2.2.2]oct-2-ene-1-carboxylic acid chloride,
4-acetoxybicyclo[2.2.2]octane-1-carboxylic acid chloride,
4-acetoxybicyclo[2.2.2]oct-2-ene-1-carboxylic acid chloride,
4-methoxybicyclo[2.2.2]octane-1-carboxylic acid chloride,
4-methoxybicyclo[2.2.2]oct-2-ene-1-carboxylic acid chloride,
4-methoxymethylbicyclo[2.2.2]octane-1-carboxylic acid chloride,
4-methoxymethylbicyclo[2.2.2]oct-2-ene-1-carboxylic acid chloride,
4-acetoxymethylbicyclo[2.2.2]octane-1-carboxylic acid chloride, and
4-acetoxymethylbicyclo[2.2.2]oct-2-ene-1-carboxylic acid chloride.

EXAMPLE 10

A solution of 1 g. of sodium borohydride in 3 ml. of water is added to an ice cooled solution of 1 g. of bicyclo[2.2.2]octane-1-carboxylic acid in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried, and evaporated to yield bicyclo[2.2.2]octane-1-methylol which may be further purified by recrystallization from acetone:hexane.

Similarly, the above procedure can be used to prepare the other C-2 unsaturated and/or C-4 substituted 1-hydroxymethyl analogous thereof otherwise corresponding to the derivatives set forth in the third paragraph of Example 9 above.

EXAMPLE 11

Bicyclo[2.2.2]octane - 1 - methylol (15.5 g) is slowly added with stirring to 15 g. of liquid carbonyl chloride (phosgene) contained in a reaction vessel immersed in a Dry Ice-trichloroethylene bath. During the addition, the temperature of the carbonyl chloride solution is kept at or below 0° C. After the addition is complete, the temperature of the solution is allowed to slowly rise to room temperature. The mixture is maintained at room temperature with stirring for from 10 to 15 hours, steps being taken to remove expelled carbonyl chloride. Thereafter, the reaction mixture is distilled under reduced pressure to give bicyclo[2.2.2]octane - 1 - methylenechlorocarbonate.

Similarly, the above procedures can be used to prepare the other C-2 unsaturated and/or C-4 substituted analogs thereof otherwise corresponding to the derivatives set forth in the third paragraph of Example 9 above, with the exception of the 4-cyano, 4-acyloxy, and 4-acyloxymethyl derivatives.

EXAMPLE 12

The procedure set forth in Examples 10 and 11 are repeated substituting tricyclo[3.3.1.1$^{1,5}$]decane - 1 - carboxylic acid(adamantane - 1 - carboxylic acid) in lieu of bicyclo[2.2.2]octane - 1 - carboxylic acid thus giving tricyclo[3.3.1.1$^{1,5}$]decane - 1 - methylol initially and tricyclo[3.3.1.1$^{1,5}$]decane - 1 - methylenechlorocarbonate as a final product.

EXAMPLE 13

To a mixture of 10 g. of bicyclo[2.2.2]octane - 1 - carboxylic acid in a solution consisting of 25 ml. of ether and 10 ml. of pyridine is added a cold ether solution containing the chemical equivalent of acetyl chloride. The reaction mixture is allowed to stand at 0° C. for four hours and the resultant precipitate removed by filtration. The solution is washed with 25 ml. of concentrated hydrochloric acid, ice water, a 7% sodium hydroxide solution and again ice water, the washed solution is dried at 0° C. over sodium sulfate, filtered, the ether evaporated to give bicyclo[2.2.2]octane - 1 - carboxylic acetyl anhydride which can be recrystallized from methanol.

Similarly, the other corresponding mixed anhydride starting compounds are analogously prepared.

These derivatives can be substituted for the corresponding acid chlorides employed in Example 1 with similar results.

EXAMPLE 14

A solution of 1 g. of 1-ethyl - 2 - methyl-2-carbethoxy-7-hydroxy - 1,2,3,4 - tetrahydrophenanthrene in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 1-ethyl - 2 - methyl-2-hydroxymethyl-7-hydroxy - 1,2,3,4 - tetrahydrophenanthrene which may be further purified through recrystallization from acetone:hexane.

In a similar manner, the corresponding 1 - methyl-2-ethyl, 1,2 - dimethyl, 1,2 - diethyl, 1,2,3,4,9,10 - hexahydro, and 1,2,3,4,9,10,11,12 - octahydro derivatives thereof or combinations thereof are thus prepared from the respective starting compounds.

EXAMPLE 15

A solution of 1 g. of 1-ethyl-2-methyl-2-carbethoxy-7-hydroxy-1,2,3,4-tetrahydrophenanthrene in 50 ml. of ethylene glycol is heated at reflux for three hours with a solution of potassium hydroxide in 1 ml. of water. The reaction mixture is then poured into ice water and the solid which forms is collected by filtration, washed with water to neutrality and dried to yield 1-ethyl-2-methyl-2-carboxy-7-hydroxy-1,2,3,4-tetrahydrophenanthrene which is recrystallized from methylene chloride:ether.

In a similar manner, the corresponding 1-methyl-2-ethyl, 1,2-dimethyl, 1,2-diethyl, 1,2,3,4,9,10-hexahydro, and 1,2,3,4,9,10,11,12-octahydro derivatives thereof or combinations thereof are thus prepared from the respective starting compounds.

EXAMPLE 16

A solution of 1 g. of 1-ethyl-2-methyl-2-carboxy-7-methoxy-1,2,3,4-tetrahydrophenanthrene in 30 ml. of anhydrous methylene chloride is allowed to react with 1 g. of N-(2-chloro-1,1,2-trifluoroethyl)diethylamine. The reaction mixture is heated under reflux for a period of five hours. The mixture is then poured into ice water and the product extracted with ether. The extracts are dried and evaporated to dryness to yield the 1-ethyl-2-methyl-2-fluoroformyl-7-methoxy-1,2,3,4 - tetrahydrophenanthrene which is recrystallized from acetone:hexane.

In a similar manner, the corresponding 1-methyl-2-ethyl, 1,2-dimethyl, 1,2-diethyl, 1,2,3,4,9,10-hexahydro, and 1,2,3,4,9,10,11,12-octahydro derivatives thereof or combinations thereof are thus prepared from the respective starting compounds.

The foregoing can also be practiced with the corresponding 7-tetrahydrofuranyloxy, 7-tetrahydropyranyloxy, 7-cyclopentyloxy, and/or 7-acyloxy(acetoxy) starting compounds.

EXAMPLE 17

A solution of 1 g. of 1-ethyl-2-methyl-2-carboxy-7-tetrahydropyran-2'-yloxy-1,2,3,4-tetrahydro-2 - phenanthrenecarboxylic acid in 20 ml. of carbon tetrachloride is allowed to react with 2 g. of triphenylphosphine. The reaction mixture is held at 25° C. for a period of 12 hours. The mixture is then poured into ice water, filtered and the product is extracted with ether. The extracts are dried and evaporated to dryness to yield 1-ethyl-2-methyl-2-chloroformyl-7-tetrahydropyran-2'-yloxy1,2,3,4 - tetrahydrophenanthrene which is purified by chromatography over florisil and recrystallized from acetone:hexane.

In a similar manner, the corresponding 1-methyl-2-ethyl, 1,2-dimethyl, 1,2-diethyl 1,2,3,4,9,10-hexahydro, and 1,2,3,4,9,10,11,12-octahydro derivatives thereof or compounds thereof are thus prepared from the respective starting compounds.

EXAMPLE 18

A mixture of 1 g. of 1,2-dimethyl-2-hydroxymethyl-7-(bicyclo[2.2.2]octane-1'-carbonyloxy) - 1,2,3,4 - tetrahydrophenanthrene, 4 ml. of pyridine, and 2 ml. of acetic anhydride is allowed to stand at room temperature for 15 hours. The mixture is then poured into ice water and the solid which forms is collected by filtration, washed with water, and dried to yield 1,2-dimethyl-2-acetoxymethyl-7-(bicyclo[2.2.2]octane-1'-carbonyloxy) - 1,2,3,4 - tetrahydrophenanthrene which may be further purified through recrystallization from acetone:hexane.

A mixture of 2 g. of 1,2-dimethyl-2-hydroxymethyl-7-(bicyclo[2.2.2]octane-1'-carbonyloxy) - 1,2,3,4 - tetrahydrophenanthrene in 8 ml. of pyridine and an equimolar amount of benzoyl chloride is heated at stream bath temperatures for 30 minutes. The mixture is then poured into ice water and the solid which forms is collected by filtration, washed with water, and dried to yield 1,2-dimethyl-2-benzoyloxymethyl - 7 - (bicyclo[2.2.2]octane -1' - carbonyloxy)-1,2,3,4-tetrahydrophenanthrene which is further purified through recrystallization from methylene chloride:hexane.

A mixture of 2 g. of 1,2-dimethyl-2-hydroxymethyl-7-(bicyclo[2.2.2] octane-1'-carbonyloxy)-1,2,3,4-tetrahydrophenanthrene in 8 ml. of pyridine and 4 ml. of adamantoyl chloride is heated at steam bath temperatures for one hour. The mixture is then poured into ice water and the solid which forms is collected by filtration, washed with water, and dried to yield 1,2-dimethyl-2-adamantoyloxy-methy-7-(bicyclo[2.2.2]octane-1' - carbonyloxy) - 1,2,3,4,-tetrahydrophenanthrene which is further purified through recrystallization from methylene chloride:hexane.

Similarly, the other conventional hydrolyzable esters can also be thus attached to the methyl group at the C–2 position of any of the enumerated compounds prepared as outlined in Examples 3, 6, and 8 above.

In like manner, the 7-hydroxy compounds bearing a mono novel ester grouping at C–2 position, which compounds are prepared in accordance with the procedures set forth in Examples 2, 4, 5, and 7 above, can also be so acylated.

To a suspension of 5 g. of 1,2-dimethyl-2-hydroxy-methyl - 7 - (bicyclo[2.2.2]octane - 1' - carbonyloxy) - 1,2,3,4-tetrahydrophenanthrene in 25 ml. of acetone is added a solution of 70 g. of potassium hydroxide in 37.5 ml. of water and the stirred mixture is treated dropwise with 10 ml. of dimethyl sulfate. The mixture is stirred for an additional 45 minutes and then poured into dilute hydrochloric acid. The solid which forms is collected by filtration and dried to yield 1,2-dimethyl-2-methoxymethyl-7-(bicyclo[2.2.2]octane - 1' - carbonyloxy) - 1,2,3,4 - tetrahydrophenanthrene which is recrystallized from chloroform:methanol.

Similarly, the other 2-alkoxymethyl ethers hereof are analogously prepared. Alternatively, the hydrophenanthrenes already bearing a 2-alkoxymethyl group are esterified as set forth hereinabove.

In like manner, the corresponding 7-alkyl ethers are so prepared from the starting 7-hydroxy derivatives.

EXAMPLE 19

Two milliliters of dihydropyran are added to a solution of 1 g. of 1-ethyl-2-methyl-2-carbethoxy-7-hydroxy-1,2,3,4-tetrahydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for four days and is then washed with aqueous sodium carbonate solution and water, dried, and evaporated. The residue is chromatographed on neutral alumina, eluting with hexane, to yield 1-ethyl-2-methyl-2-carbethoxy - 7 - (tetrahydropyran-2'-yloxy)-1,2,3,4-tetrahydrophenanthrene which is recrystallized from pentane.

In a similar manner, the corresponding 1-methyl-2-ethyl, 1,2-dimethyl, 1,2-diethyl, 1,2,3,4,9,10-hexahydro, and 1,2,3,4,9,10,11,12-octahydro derivatives thereof or combinations thereof are thus prepared from the respective starting compounds.

The above procedure can also be used with the corresponding 2-hydroxymethyl and 2-carboxy derivatives prepared as described above.

EXAMPLE 20

To a solution of 1 g. of 1-ethyl-2-methyl-2-carbethoxy-7-hydroxy-1,2,3,4-tetrahydrophenanthrene in 20 ml. of dihydrofuran. Five milliliters are distilled off to remove moisture and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutrality, dried over anhydrous magnesium sulfate, and evaporated to dryness under reduced pressure. The oily residue crystallizes on the addition of ether to yield the 1-ethyl-2-methyl-2 - carbethoxy-7-(tetrahydrofuran-2'-yloxy)-1,2,3,4-tetrahydrophenanthrene.

In a similar manner, the corresponding 1-methyl-2-ethyl, 1,2-dimethyl, 1,2-diethyl, 1,2,3,4,9,10-hexahydro, and 1,2,3,4,9,10,11,12-octahydro derivatives thereof or combinations thereof are thus prepared from the respective starting compounds.

The above procedure can also be used with the corresponding 2-hydroxymethyl and 2-carboxy derivatives prepared as described above.

EXAMPLE 21

A solution of one chemical equivalent of 1-ethyl-2-methyl - 2 - carbethoxy-7-hydroxy-1,2,3,4-tetrahydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1-ethyl-2-methyl-2-carbethoxy - 7 - cyclopentyloxy - 1,2,3,4-tetrahydrophenanthrene which is further purified upon recrystallization from pentane.

In a similar manner, the corresponding 1-methyl-2-ethyl, 1,2-dimethyl, 1,2-diethyl, 1,2,3,4,9,10-hexahydro, and 1,2,3,4,9,10,11,12-octahydro derivatives thereof or combinations thereof are thus prepared from the respective starting compounds.

The above procedure can also be used with the corresponding 2-hydroxymethyl and 2-carboxy derivatives prepared as described above.

What is claimed is:
1. Compounds of the formula:

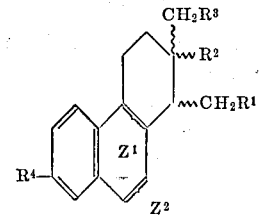

wherein $R^1$ is hydrogen or methyl; $R^2$ is a polycyclic group represented by the formula:

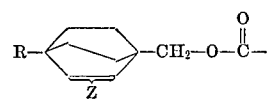

in which
R is hydrogen, chloro, fluoro, trifluoromethyl, cyano, (lower)alkyloxy, lower alkanoyloxy, (lower)alkyloxymethyl, lower alkanoyloxymethyl, (lower)alkyl or aryl; and Z is a carbon-carbon single bond or a carbon-carbon double bond;
$R^3$ is hydrogen or methyl; and
$R^4$ is hydroxy lower alkanoyloxy, (lower)alkyloxy, cyclopentyloxy, and
each of $Z^1$ and $Z^2$ is a carbon-carbon single bond or a carbon-carbon double bond, $Z^2$ being a single bond when $Z^1$ is a single bond.

2. A compound according to claim 1 wherein $R^1$ is methyl, $R^2$ is the group

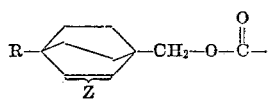

in which

R is hydrogen and Z is a carbon-carbon single bond; and $R^3$ is hydrogen, $R^4$ is hydroxy, and each $Z^1$ and $Z^2$ is a carbon-carbon double bond.

3. A compound according to claim 1 wherein $R^1$ is methyl, $R^2$ is the group

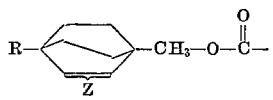

in which

R is hydrogen, and Z is a carbon-carbon single bond; and $R^3$ is hydrogen, $R^4$ is methoxy, and each of $Z^1$ and $Z^2$ is a carbon-carbon double bond.

4. A compound according to claim 1 wherein $R^1$ is methyl, $R^2$ is the group

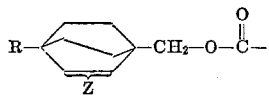

in which

R is methyl, and Z is a carbon-carbon single bond; and $R^3$ is hydrogen, $R^4$ is hydroxy, and each of $Z^1$ and $Z^2$ is a carbon-carbon double bond.

5. A compound according to claim 1 wherein $R^1$ is methyl, $R^2$ is the group

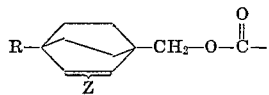

in which

R is methyl, and Z is a carbon-carbon single bond; and $R^3$ is hydrogen, $R^4$ is methoxy, and each of $Z^1$ and $Z^2$ is a carbon-carbon double bond.

6. A compound according to claim 1 wherein $R^1$ is methyl, $R^2$ is the group

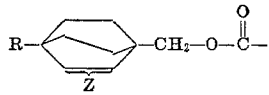

in which

R is hydrogen, and Z is a carbon-carbon double bond; and $R^3$ is hydrogen, $R^4$ is hydroxy, and each of $Z^1$ and $Z^2$ is a carbon-carbon double bond.

7. A compound according to claim 1 wherein $R^1$ is methyl, $R^2$ is the group

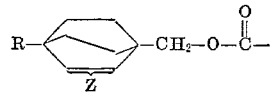

in which

R is hydrogen, and Z is a carbon-carbon double bond; and $R^3$ is hydrogen, $R^4$ is methoxy, and each of $Z^1$ and $Z^2$ is a carbon-carbon double bond.

8. A compound according to claim 1 wherein $R^1$ is methyl, $R^2$ is the group

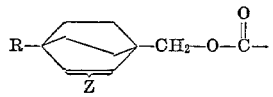

in which

R is methyl, and Z is a carbon-carbon double bond; and $R^3$ is hydrogen, $R^4$ is hydroxy, and each of $Z^1$ and $Z^2$ is a carbon-carbon double bond.

9. A compound according to claim 1 wherein $R^1$ is methyl, $R^2$ is the group

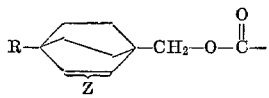

in which

R is methyl, and Z is a carbon-carbon double bond; and $R^3$ is hydrogen, $R^4$ is methoxy, and each of $Z^1$ and $Z^2$ is a carbon-carbon double bond.

References Cited

Fieser: Steroids, 1959, p. 491.

LORRAINE A. WEINBERGER, Primary Examiner

R. GERSTL, Assistant Examiner

U.S. Cl. X.R.

260—294.3 E, 345.8, 347.4, 463, 468 B, 473 G, 476 R, 345.7, 347.3, 410.5, 465 D, 471 R, 476 C, 482 R; 424—484 R, 486 R, 488 B, 963, 299, 485 L, 487, 939

UNITED STATES PATENT OFFICE
CERTIFICATE OF CORRECTION

Patent No. 3,636,072         Dated January 18, 1972

Inventor(s) Alexander D. Cross

It is certified that error appears in the above-identified patent and that said Letters Patent are hereby corrected as shown below:

Column 1, line 64, "rpresented" should be -- represented --.
Column 4, line 53, "C.2" should be -- C-2 --.
Column 5, line 32, delete "Examples" and insert -- Formulas --.
Column 6, line 42, "as" should be -- at --.
Column 8, line 72, "7-lower)alkyloxy," should be -- 7-(lower)alkyloxy, --.
Column 15, Claim 3, the formula should appear as follows:

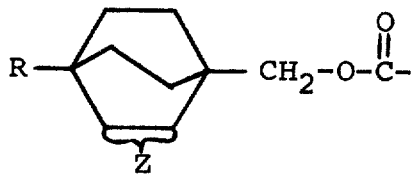

Signed and sealed this 27th day of June 1972.

SEAL)
Attest:

EDWARD M. FLETCHER, JR.
Attesting Officer

ROBERT GOTTSCHALK
Commissioner of Patents